United States Patent [19]

Janda et al.

[11] Patent Number: 4,943,621

[45] Date of Patent: Jul. 24, 1990

[54] STORAGE STABLE COMPONENTS OF REACTIVE FORMULATIONS FOR BULK POLYMERIZATION OF CYCLOOLEFIN MONOMERS

[75] Inventors: Dennis J. Janda, Parma; Paul T. Stricharczuk, Twinsburg; Robert J. Minchak, Parma Heights, all of Ohio

[73] Assignee: The B. F. Goodrich Company, Akron, Ohio

[21] Appl. No.: 228,033

[22] Filed: Aug. 4, 1988

[51] Int. Cl.$^5$ .............................. C08F 4/32; C08F 4/52
[52] U.S. Cl. ..................................... 526/127; 526/133; 526/142; 526/161; 526/166; 526/185; 526/187; 526/188; 526/189; 526/281; 526/282; 526/283; 526/902; 526/77; 526/169; 502/114; 502/115; 502/117; 502/154
[58] Field of Search ............... 526/127, 133, 161, 165, 526/166, 281, 283, 142, 185, 187, 188, 189, 169; 502/154, 114, 115, 156, 125

[56] References Cited

U.S. PATENT DOCUMENTS

| | | | |
|---|---|---|---|
| 2,721,189 | 10/1955 | Anderson et al. | 526/281 |
| 2,831,037 | 4/1958 | Schmerling | 526/281 |
| 2,932,630 | 4/1960 | Robinson et al. | 526/281 |
| 3,074,918 | 1/1963 | Eleuterio | 526/308 |
| 3,330,815 | 7/1967 | McKeon | 526/281 X |
| 3,367,924 | 2/1968 | Rinehart | 526/281 X |
| 3,467,924 | 9/1969 | Harris et al. | 526/281 X |
| 3,546,183 | 12/1970 | Vergne et al. | 526/281 X |
| 3,557,072 | 1/1971 | Vergne et al. | 526/75 X |
| 3,778,420 | 12/1973 | Brown et al. | 526/308 X |
| 3,781,257 | 12/1973 | Pampus et al. | 526/308 X |
| 3,790,545 | 2/1974 | Minchak | 526/283 |
| 3,836,593 | 9/1974 | Streck et al. | 526/283 X |
| 3,853,830 | 12/1974 | Minchak | 526/308 |
| 3,879,343 | 4/1975 | DeBrunner et al. | 260/45.75 |
| 4,002,815 | 1/1977 | Minchak | 526/283 |
| 4,020,021 | 4/1977 | Lahouste et al. | 526/281 X |
| 4,136,247 | 1/1979 | Tenney et al. | 526/283 |
| 4,136,248 | 1/1979 | Tenney | 526/283 |
| 4,136,249 | 1/1979 | Tenney et al. | 526/283 |
| 4,178,424 | 12/1979 | Tenney et al. | 526/283 |
| 4,239,874 | 12/1980 | Ofstead et al. | 526/143 |
| 4,301,306 | 11/1981 | Layer | 568/734 |
| 4,324,717 | 4/1982 | Layer | 524/244 |
| 4,357,449 | 11/1982 | Yi | 526/74 |
| 4,360,629 | 11/1982 | Wootton et al. | 524/553 |
| 4,380,617 | 4/1983 | Minchak et al. | 526/161 |
| 4,400,340 | 8/1983 | Klosiewicz | 526/77 X |
| 4,400,501 | 8/1983 | Lane, Jr. et al. | 528/496 |
| 4,410,691 | 10/1983 | Lane, Jr. et al. | 526/283 X |
| 4,410,692 | 10/1983 | Tenney et al. | 526/281 X |
| 4,414,386 | 11/1983 | Lane, Jr. | 528/496 |
| 4,426,502 | 1/1984 | Minchak | 526/172 |
| 4,436,858 | 3/1984 | Klosiewicz | 526/169 X |
| 4,469,809 | 9/1984 | Klosiewicz | 502/117 |
| 4,485,208 | 11/1984 | Klosiewicz | 526/169 X |
| 4,507,453 | 3/1985 | Tom | 526/283 |
| 4,520,181 | 5/1985 | Klosiewicz | 525/247 |
| 4,568,660 | 2/1986 | Klosiewicz | 502/169 |
| 4,584,425 | 4/1986 | Tom | 585/827 |
| 4,598,102 | 7/1986 | Leach | 521/93 |
| 4,657,981 | 4/1987 | Klosiewicz | 526/142 X |
| 4,661,575 | 4/1987 | Tom | 526/283 |
| 4,689,380 | 8/1987 | Nahm | 526/283 |
| 4,696,985 | 9/1987 | Martin | 526/119 |
| 4,699,963 | 10/1987 | Klosiewicz | 526/142 |
| 4,748,216 | 5/1988 | Tom | 526/77 |

FOREIGN PATENT DOCUMENTS 0280247  8/1988  European Pat. Off. ............ 526/283

*Primary Examiner*—Joseph L. Schofer
*Assistant Examiner*—F. M. Teskin
*Attorney, Agent, or Firm*—Venable, Baetjer, Howard & Civiletti

[57] ABSTRACT

Methods of preparing storage stable components useful for metathesis bulk polymerization of cycloolefin monomers are provided. These components contain cycloolefins with norbornene-functional groups and cocatalysts activated with a halometal compound. In these methods, the cocatalyst is completely formed before the halometal activator is added to prevent the formation of unwanted hydrogen halides, which catalyze undesired crosslinking reactions which destabilize the cocatalyst component. Bulk polymerization systems are provided wherein these storage stable cocatalyst components are paired with catalyst components that together form the complete metathesis catalyst system. For some embodiments, storage stability is aided by the removal of water.

24 Claims, No Drawings

STORAGE STABLE COMPONENTS OF REACTIVE FORMULATIONS FOR BULK POLYMERIZATION OF CYCLOOLEFIN MONOMERS

FIELD OF THE INVENTION

This invention is directed to storage stable components of a reactive formulation comprised of cycloolefin monomers having a norbornene moiety and a ring-opening metathesis catalyst system. This reactive of the monomers therein.

BACKGROUND OF THE INVENTION

Polymers obtained by a ring-opening polymerization of cycloolefin monomers that have a norbornene moiety (cycloolefins) are well known. For example, U.S. Pat. Nos. 4,136,249, 4,178,424, 4,136,247 and 4,136,248, assigned to the same assignee as the present invention, describe such polymers and each is incorporated herein by reference for the description of polymers therein.

Depending on the specific cycloolefins chosen, ring-opening polymerization of cycloolefins yields unsaturated linear, branched and crosslinked polymers. They are known to exhibit attractive property profiles for many polymer applications, such as, automotive and non-automotive body panel parts, equipment housings, furniture, window frames and shipment dunnage.

Dicyclopentadiene, for example, is a common cycloolefin monomer used to prepare ring-opened polymerized polymers in that these cycloolefin monomers are readily available as by-products in ethylene production. Recent U.S. patents directed to dicyclopentadiene polymers include U.S. Pat. Nos. 3,778,420, 3,781,257, 3,790,545, 3,853,830, 4,002,815 and 4,239,874. Other well known cycloolefin monomers include bicyclic norbornene (bicyclo[2.2.1]-hept-2-ene) and substituted bicyclic norbornenes, which are produced by Diels-Alder reaction of cyclopentadiene with selected olefins. U.S. Pat. No. 3,074,918 describes the polymerization of cycloolefin monomers including bicyclic norbornene and substituted bicyclic norbornenes, as do other U.S. patents such as U.S. Pat. Nos. 3,546,183, 2,721,189, 2,831,037, 2,932,673, 3,330,815, 3,367,924, 3,467,633, 3,836,593, 3,879,343 and 4,020,021. The above patents are incorporated herein by reference for their disclosure of polymers obtained from ring-opening polymerization of bicyclic norbornenes and substituted bicyclic norbornenes.

Tetracyclododecene and substituted tetracyclododecenes are also well known cycloolefins. These are made by Diels-Alder reaction of cyclopentadiene with bicyclic norbornene or the appropriate substituted bicyclic norbornene. Ring-opening polymerization of tetracyclododecene with other cyclic olefin comonomers (bicyclicnorbornene and substituted bicyclicnorbornenes) has been disclosed in U.S. Pat. No. 3,557,072, incorporated herein by reference for the polymerizations disclosed therein.

Ring-opened polymers and copolymers of dicyclopentadiene and tetracyclododecene are known to have excellent glass transition temperatures (Tg). Because of their high Tg values, these polymers are difficult to melt process once formed. Crosslinking in the melt also occurs when the ring-opened polymer or copolymer contains a pendant five member unsaturated ring such as results when dicyclopentadiene is used to form the polymer or copolymer. Crosslinked polymers are extremely difficult to melt process. This poses a significant disadvantage to solution polymerized polymers which must be melt processed to provide finished articles. In contrast, for polymers and copolymers prepared in bulk, processing, in terms of melt flow, is less of a problem since the polymerization takes place in a mold and in the shape desired. Melt processing for such bulk polymerized polymers and copolymers is normally not required. Therefore, bulk polymerization provides significant advantages where high temperature resistance is desired in the finished article.

Solution polymerization of cycloolefins is accomplished in the presence of (1) a solvent and (2) a metathesis catalyst comprising at least one alkyl aluminum halide cocatalyst and at least one tungsten or molybdenum compound as catalyst. In contrast, bulk polymerization is defined as polymerization in the absence of a solvent or diluent.

Early attempts at the bulk polymerization of cycloolefins using the metathesis catalyst systems of solution polymerization ended in failure because the polymerization reactions were too rapid in the absence of solvent and therefore, uncontrollable. Furthermore, initial bulk polymerization attempts resulted in materials that were very dark, had poor physical properties and poor appearance.

Further developments in the bulk polymerization of cycloolefins led to another approach, which, likewise, was unsuccessful. This approach was characterized by splitting the monomer charge into two equal portions, one containing the catalyst and the other containing cocatalyst. The object was to mix the two portions of the monomer charge at room temperature and then transfer the mix to a heated mold where polymerization and hardening would occur very quickly. It was discovered that instantaneous reaction took place upon contact of the two portions (pre-gellation), whereby a polymer barrier was formed between the two portions of the monomer charge, encapsulating some of the monomer from each portion which prevented mixing.

Minchak describes a modified catalyst system in U.S. Pat. No. 4,426,502 which serves to control the instantaneous reaction between the two portions of the monomer charge, one containing catalyst and the other containing cocatalyst, which permits adequate mixing of these two components without encapsulation.

While the catalyst systems of Minchak provide adequate control over the bulk polymerization reaction, there are other obstacles the manufacturers of molded articles must face. For example, if such a manufacturer is to take advantage of a bulk polymerization reaction of cycloolefins, it is necessary to ship and store the reactive monomers. While it is known the two components of the reactive formulation can be prepared from the reactive monomers both rapidly and efficiently, it is preferable that the monomers be provided with all the necessary additives and catalyst components so that the manufacturer can avoid additional processing and perform bulk polymerization in a single operation.

To achieve this, the reactive monomers are preferably provided in two components, one component containing cycloolefin monomer, cocatalyst, and optionally, a halometal activator, and the other component containing cycloolefin monomer and catalyst. It has been found that some metathesis catalysts, such as molybdenum and tungsten halides do not provide stable mixtures with cycloolefin monomers. The ammonium molybdate and ammonium tungstate catalysts and the alkylalkoxy aluminum halide cocatalysts described by Minchak in U.S. Pat. No. 4,426,502, when separately mixed with cycloolefin monomers alone, have been found to exhibit better than average storage stability when compared to mixtures containing other metathesis catalysts. However, where there is a desire to "activate" the cocatalyst to increase the degree of monomer conversion to polymer in bulk polymerization, it has been found the stability of such mixtures can be lost. This instability can be manifested by changes in color, an increased viscosity, gel formation or loss of catalyst activity. Often these symptoms are due to reactions taking place with certain additives. For example, impact modifiers containing unsaturated carbon atoms are believed to react in the presence of hydrogen chloride to cause the impact modifier to crosslink and thus causes the cocatalyst mixture to become viscous or gel. In certain circumstances, stability problems can be avoided by the proper selection of additives. However, restricting the additives utilized limits the versatility of products obtained.

This invention provides a storage stable cocatalyst component of a reactive formulation, such component comprising at least one cycloolefin monomer containing a norbornene group and a halometal activated metathesis cocatalyst. Methods for producing these storage stable components are also provided. Reactive formulations obtained from this cocatalyst component and a metathesis catalyst component polymerize into hard objects in a single step by means of reaction injection molding (RIM), resin transfer molding (RTM), liquid injection molding (LIM), or other bulk polymerization process.

SUMMARY OF THE INVENTION

The present invention provides a storage stable cocatalyst component of a reactive formulation wherein the reactive formulation comprises two or more components, such reactive formulation minimally containing one or more cycloolefin monomers, a ring-opening methathesis catalyst and activated ring-opening metathesis cocatalyst in sufficient quantity to polymerize the cycloolefin monomers in bulk. This storage stable cocatalyst component comprises:

(a) one or more cycloolefin monomers having a norbornene moiety;
(b) a cocatalyst prepared by reacting an alkylaluminum or alkylaluminum halide with an active hydroxyl-containing compound or compounds; and
(c) a halometal activator.

Methods for preparing storage stable components of reactive formulations are provided by this invention. The method comprises the sequential steps of forming a mixture of one or more cycloolefin monomers, preparing, in situ, the cocatalyst in these cycloolefin monomers and lastly, adding a halometal activator. Before the in situ preparation of the cocatalyst, the mixture of cycloolefin monomers is maintained substantially free of compounds which deactivate the cocatalyst. These mixtures are also substantially free of hydrogen halides.

Also provided by this invention are methods for preparing storage stable components wherein water is removed, such as by azeotropic distillation. This water is very detrimental to the storage stability of the cocatalyst component; it is very desirable to keep their level in the cocatalyst component to less than 50 ppm. Azeotropic distillation of the cycloolefin monomer, before adding or forming the cocatalyst in situ, removes these traces of water.

Also provided by this invention are polymerization systems which comprise the storage stable cocatalyst components of the present invention described above complemented with other catalyst components which are stable when stored separately. When combined, these components form a reactive formulation.

DETAILED DESCRIPTION OF THE INVENTION

In order to mold plastic articles by reaction injection molding (RIM), resin transfer molding (RTM), liquid injection molding (LIM), casting, lay up or spray up procedures, a reactive formulation of monomers which polymerize to substantially complete conversion to polymer must be provided. The reactive formulations with which this invention is concerned contain cycloolefin monomers combined with an activated ring-opening metathesis catalyst system which polymerizes these monomers to at least 90% conversion.

This invention provides storage stable cocatalyst components of such reactive formulations. A polymerization system is provided wherein the storage stable cocatalyst components of this invention are complemented with other separately stored catalyst components. These other catalyst components contain the elements necessary to complete the reactive formulation. When the storage stable components of the polymerization system are combined, a reaction mix is obtained. In preferred embodiments, the polymerization system can be used as a complete feedstock for reaction injection molding (RIM), RTM or LIM processes.

The cycloolefin monomers within the storage stable components provided by this invention are characterized by the presence of at least one norbornene moiety.

Suitable cycloolefin monomers include substituted and unsubstituted norbornenes, dicyclopentadienes, dihydrodicyclopentadienes, trimers of cyclopentadiene, tetramers of cyclopentadiene, tetracyclododecenes, hexacycloheptadecenes, ethylidenenorbornenes and vinylnorbornenes. Substituents on the cycloolefin monomers include hydrogen, alkyl and aryl groups of 1 to 20 carbon atoms, and saturated and unsaturated cyclic groups of 3 to 12 carbon atoms which can be formed with one or more, preferably two, ring carbon atoms. In a preferred embodiment, the substituents are selected from hydrogen and alkyl groups of 1 to 2 carbon atoms. Generally speaking, the substituents on the cycloolefin monomers can be any which do not poison or deactivate the polymerization catalyst.

Examples of the preferred monomers referred to herein include
dicyclopentadiene,
methyltetracyclododecene,
2-norbornene, and other norbornene monomers such as
5-methyl-2-norbornene,
5,6-dimethyl-2-norbornene,
5-ethyl-2-norbornene,
5-ethylidenyl-2-norbornene,
5-butyl-2-norbornene,
5-hexyl-2-norbornene,
5-octyl-2-norbornene,
5-phenyl-2-norbornene,
5-dodecyl-2-norbornene,
5-isobutyl-2-norbornene,
5-octadecyl-2-norbornene, 5-isopropyl-2-norbornene,
5-phenyl-2-norbornene,
5-p-toluyl-2-norbornene,
5-a-naphthyl-2-norbornene,
5-cyclohexyl-2-norbornene,
5,5-dimethyl-2-norbornene,
dihydrodicyclopentadiene (or cyclopentene-cyclopentadiene co-dimer),
methylcyclopentadiene dimer,
ethylcyclopentadiene dimer,
tetracyclododecene
9-ethyl-tetracyclo[6,2,1,1$^{3,6}$,0$^{2,7}$]dodecene-4, (or ethyl-tetracyclododecene)
9-propyl-tetracyclo[6,2,1,1$^{3,6}$,0$^{2,7}$]dodecene-4,
9-hexyl-tetracyclo[6,2,1,1$^{3,6}$,0$^{2,7}$]dodecene-4,
9-decyl-tetracyclo[6,2,1,1$^{3,6}$,0$^{2,7}$]dodecene-4,
9,10-dimethyl-tetracyclo[6,2,1,1$^{3,6}$,0$^{2,7}$]dodecene-4,
9-methyl,10-ethyl-tetracyclo[6,2,1,1$^{3,6}$,0$^{2,7}$]dodecene-4,
9-cyclohexyl-tetracyclo[6,2,1,1$^{3,6}$,0$^{2,7}$]dodecene-4,
9-chloro-tetracyclo[6,2,1,1$^{3,6}$,0$^{2,7}$]dodecene-4,
9-bromo-tetracyclo[6,2,1,1$^{3,6}$,0$^{2,7}$]dodecene-4,
9-fluoro-tetracyclo[6,2,1,1$^{3,6}$,0$^{2,7}$]dodecene-4,
9-isobutyl-tetracyclo[6,2,1,1$^{3,6}$,0$^{2,7}$]dodecene-4,
9,10-dichloro-tetracyclo[6,2,1,1$^{3,6}$,0$^{2,7}$]dodecene-4.

This invention especially contemplates the use of one or more of the following monomers within the storage stable components so as to provide both homopolymers and copolymers upon polymerization. Copolymers are defined as polymers composed of two or more monomers.
norbornene,
methylnorbornene,
tetracyclododecene,
methyltetracyclododecene,
dicyclopentadiene,
5-ethylidene-2-norbornene,
trimers of dicyclopentadiene,
tetramers of dicyclopentadiene, and
hexacycloheptadecene.

Dicyclopentadiene (DCPD), methylnorbornene (MNB), methyltetracyclododecene (MTD), and methyldicyclopentadiene (MDCPD) have the following structures:

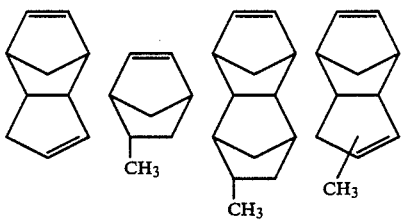

The cycloolefin monomers contemplated herein also include monomers disclosed in Layer U.S. Pat. No. 4,301,306 and Layer U.S. Pat. No. 4,324,717, all of which contain the norbornene structure depicted above.

The storage stable cocatalyst components and those of the polymerization systems provided by this invention comprise one or more of these cycloolefin monomers.

As indicated above, the reactive formulations contain a ring-opening metathesis catalyst system which provides for ring-opening polymerization of the cycloolefin monomers therein. Suitable ring-opening metathesis catalyst systems are those described by Minchak in U.S. Pat. No. 4,426,502. These catalyst systems comprise organo-ammonium tungstate and/or molybdate catalysts together with alkoxy alkylaluminum halide or aryloxy alkylaluminum halide cocatalysts.

The storage stable cocatalyst components provided by this invention contain the cocatalysts of a metathesis catalyst system. The polymerization systems provided by this invention comprise at least two storage stable components, one of which contains the cocatalyst, the other contains the organo-ammonium molybdate or ammonium tungstate metathesis catalyst. When combined, the complete metathesis catalyst system is obtained.

While other molybdenum and tungsten compounds are known to provide ring-opening polymerization, such as the molybdenum and tungsten halides, these compounds do not provide storage stable catalyst components at room temperature and therefore are not used in the components of the polymerization system.

The organo-ammonium molybdate and tungstate metathesis catalysts are soluble in cycloolefin monomers, can be handled at room temperature, are stable in the presence of air and moisture, and they do not prematurely polymerize the cycloolefins at room temperature when mixed therein. In a preferred embodiment, the ammonium molybdate and tungstate catalysts are solubilized in a monomer solution to facilitate mixing the catalyst within the components of the polymerization system.

The organoammonium molybdates and tungstates suitable for use in the catalyst components of the polymerization system which forms a reactive formulation are defined as follows:

[R$_4$N]$_{(2y-6x)}$M$_x$O$_y$ and [R$^1_3$NH]$_{(2y-6x)}$M$_x$O$_y$ where O represents oxygen; M represents either molybdenum or tungsten; x and y represent the number of M and O atoms, respectively, in the molecule based on the valance of +6 for molybdenum, +6 for tungsten, and −2 for oxygen and the R and R$^1$ radicals are independently selected from hydrogen, alkyl and alkylene groups each containing 1–20 carbon atoms, and cycloaliphatic groups each containing 5–16 carbon atoms. All the R and R$^1$ radicals cannot be hydrogens.

In a preferred embodiment, the R radicals are independently selected from alkyl groups each containing 1 to 18 carbon atoms wherein the sum of carbon atoms on all the R radicals is from 20 to 72, more preferably from 25 to 48. In another preferred embodiment, the R$^1$ radicals are selected from alkyl groups each containing from 1 to 18 carbon atoms wherein the sum of carbon atoms on all of the R radicals is from 15 to 54, more preferably from 21 to 42. Reference is made to columns 6, 7 and 8 of U.S. Pat. No. 4,426,502 (Minchak) for a more detailed discussion of these catalysts.

Specific examples of suitable organoammonium molybdates and tungstates described herein include tridodecylammonium molybdates and tungstates, methyltricaprylammonium molybdates and tungstates, tri(tridecyl)ammonium molybdates and tungstates, and the like.

The organoammonium molybdates or tungstates or mixtures thereof, are employed as metathesis catalysts in the reactive formulation at a level of about 0.005 to 50 millimoles molybdenum or tungsten per mole of total monomer, preferably 0.05 to 5.0 millimoles. In preferred embodiments of the polymerization system provided by this invention, one of the storage stable components contains quantities of metathesis catalyst in the preferred range.

The cocatalyst formed from alkylaluminum halides or alkyl aluminums that is used in conjunction with the ammonium molybdate and/or ammonium tungstate metathesis catalysts in forming the metathesis catalyst system is a part of the storage stable cocatalyst component provided by this invention. These cocatalyst precursors may be selected from monoalkylaluminum dihalides, $RAlX_2$, dialkylaluminum monohalides, $R_2AlX$, alkylaluminum sesquihalides, $R_3Al_2X_3$, trialkylaluminum, $R_3Al$, and mixtures thereof. These alkyl aluminum and alkylaluminum halide cocatalyst precursors may, optionally, be used in combination with an iodine source. In the formulas for the alkyl aluminum and alkylaluminum halide cocatalyst precursors, R is an alkyl radical containing 1 to 12 carbon atoms, preferably about 2 to 8 carbon atoms, and X is a halogen selected from chlorine, iodine, bromine and fluorine.

Specific examples of such alkylaluminum halides and alkyl aluminums include ethylaluminumdichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, trioctylaluminum, triethylaluminum and triisobutylaluminum.

The amount of cocatalyst employed in the reactive formulation is commonly expressed in terms of a molar ratio with the organoammonium molybdate and/or tungstate catalyst. The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

U.S. Pat. No. 4,426,502 to Minchak describes polymerization of cycloolefins using a cocatalyst prepared by pre-reacting an alkyl aluminum or alkylaluminum halide with an alcohol, phenol or an active hydroxy-containing compound to form an alkoxy alkyl aluminum, aryloxy alkyl aluminum, alkoxyalkylaluminum halide or an aryloxyalkylaluminum halide which is then used in the polymerization reaction.

Formation of the cocatalyst is normally accomplished by conducting the reaction in situ, i.e., by reacting alkylaluminum or alkyl aluminum halide with the alcohol, phenol or other active hydroxy-containing compound within the one or more cycloolefin monomers of the storage stable component. The amount of alcohol, phenol or other active hydroxyl-containing compound used is less than 2 moles per mole of aluminum and is preferably from 0.5 to 1.0 moles per mole of aluminum. The alkoxy or aryloxy group on the cocatalyst functions to inhibit the reducing power of the cocatalyst by replacing some of the alkyl groups on the aluminum. This makes it possible to adequately mix the catalyst component and cocatalyst component together without pre-gellation and bulk polymerize the cyclic olefins. Too much alcohol, phenol, or other hydroxyl-containing compound (greater than 3 moles per mole of aluminum) can completely inactivate the cocatalyst.

Percent conversion and conversion rate can be increased by the addition of a halometal activator to the cocatalyst component. The reactive formulation provided by the storage stable cocatalyst component of the present invention contains a cocatalyst which is halometal activated. The activator referred to herein is generally a halometal compound which has the following formula:

$$R_mYX_n$$

where m is 0 to 4 and n is 1 to 5. R is individually selected from hydrogen, alkyl, alkenyl, alkoxy, aryl, alkaryl and saturated and unsaturated cyclic groups. The quantity Y is a metal selected from tin, lead, magnesium, antimony, boron, germanium, and silicon. The quantity X is individually selected from halogens which include chlorine, bromine, iodine and fluorine, preferably chlorine.

In a preferred embodiment, the initiator is selected from organic chlorosilanes of the following formula:

$$R_mSiX_n$$

where m is 0 to 3, and n is 1 to 4; R is individually selected from hydrogen, alkyl groups of 1 to 12 carbon atoms, alkoxy groups of 1 to 12 carbon atoms, alkenyl groups of 2 to 12 carbon atoms, aryl groups of 6 to 18 carbon atoms, alkaryl groups wherein there is at least one alkyl substituent on the aryl moiety containing 1 to 4 carbon atoms, and saturated and unsaturated monocyclic, dicyclic and polycyclic groups containing a total of 5 to 12 carbon atoms. In an especially preferred embodiment, R is selected from hydrogen, alkyl and alkoxy groups containing 1 to 6 carbon atoms. Specific examples of preferred activators include the following chlorosilanes: dimethylmonochlorosilane, dimethyldichlorosilane, diphenyldichlorosilane, tetrachlorosilane, and the like.

Amount of the activator used is typically less than 1 mole per mole of cocatalyst and is preferably in the range of 0.1 to 0.75 moles per mole of cocatalyst and more preferably 0.2 to 0.5 moles per mole of cocatalyst.

Generally, the use of chlorosilane activators in conjunction with RIM polymerization of cycloolefin monomers such as dicyclopentadiene (DCPD) has resulted in a number of important advantages. With these activators, polymerization rate and percent conversion have been increased markedly in reaction injection molding processes. The in-mold rate of reaction is increased whereby the reaction exotherm causes a temperature increase of 80° to 110° C. in about 1–20 seconds with an activator, whereas without the activator, the temperature increase is only about 10° to 60° C. in about 1 to 2 minutes. With the activators, polymerization conversion increases to above about 80 to 90%, generally in excess of 98%. These conversions are measured via a thermogravimetric analysis (TGA), where all volatiles driven off are considered unconverted monomer and the remaining solid is considered converted monomer. And lastly, the important advantage of being able to lower mold temperatures from approximately 95° C. to approximately 50° C. is realized. At lower mold temperatures, molded articles cool below their Tg's more quickly and, therefore, can be removed from the mold more quickly.

A different mix of advantages is realized in the use of the activators disclosed herein in RIM polymerization of methyl norbornene (MNB) or methyl tetracyclododecene (MTD) or copolymers thereof with other copolymerizable monomers. Here, percent conversion for thicker samples (⅛" to ¼") appears to be about the same at about 96% with or without the activators, whereas with thinner samples on the order of 1/32" to 1/16", conversions have increased from about 80% without activators to above 92% with the activators. The thinner samples of poly (MNB), poly (MTD) or copolymers thereof include films. The mold temperature here is also reduced substantially on the order of 20° to 40° C. or more and is advantageous because the maximum reaction temperature is lowered, allowing the production of molded objects with no or fewer voids and the molded object can be more quickly removed from the mold. The rate of reaction is increased with the use of activator in conjunction with other cycloolefins but the rate increase is not as pronounced as with dicyclopentadiene.

For the formulation components of the present invention to remain storage stable, no component can contain the complete metathesis catalyst system, i.e., one component cannot contain both the organo ammonium molybdate and/or tungstate catalyst and the alkoxy alkyl aluminum, aryloxy alkyl aluminum, alkoxy alkyl aluminum halide and/or aryloxy alkyl aluminum halide cocatalyst. The catalyst and cocatalyst must be in separate components. The halometal activator, when used, must not be added to the catalyst component. The halometal activator is normally added to the cocatalyst component. The materials from which the cocatalyst component is prepared must be substantially free of impurities, mainly water, that react with the cocatalyst or the halometal activator to give hydrogen halides. Hydrogen halides are believed to catalyze unwanted side reactions such as the crosslinking of unsaturated rubber impact modifiers and unsaturated monomers.

Water, inadvertently added to the cocatalyst component during its preparation, is very detrimental to the storage stability of the cocatalyst component. This water enters the cocatalyst component as an impurity in the cycloolefin monomers and in the inert compounding ingredients which are mainly impact modifiers, plasticizers, flame retardants, blowing agents, internal mold release agents, fillers and reinforcements. Before either the cocatalyst or halometal activator is added to the cocatalyst component, the level of water in the mixture of cycloolefin monomers and inert compounding ingredients must be lower than approximately 50 ppm.

To be assured that the level of water in the partially prepared cocatalyst component is less than 50 ppm before the cocatalyst or halometal activator is added, it can be dried via azeotropic distillation. Because water and most cycloolefin monomers form heterogeneous azeotropes, distilling off a small portion of the partially prepared cocatalyst component will remove most of the water contamination. The azeotrope (i.e., distilled off cycloolefin monomers plus water) can be passed through molecular sieves to remove the water from the azeotrope and the cycloolefin monomers returned to the partially prepared cocatalyst component.

If the partially prepared cocatalyst component contains more than 50 ppm water and this water is not removed, various detrimental impurities, mainly hydrogen halides, are formed when the cocatalyst and halometal activator are added.

If water is present in the partially prepared cocatalyst component and, counter to the teachings of this invention, the halometal activator is added before the cocatalyst is added, each mole of water present, depending on the specific halometal activator, can be converted to one mole of hydrogen halide.

If water is present in the partially prepared cocatalyst component and the teachings of this invention are adhered to, the cocatalyst will be added or formed in situ before the halometal activator is added. The water will preferentially react with the alkyl or aryl group of the cocatalyst. If the cocatalyst is formed in situ, the water will preferentially react with the alkyl or aryl group of the alkylaluminum, arylaluminum, alkylaluminum halide and/or arylaluminum halide. Very little, if any water, will be converted to hydrogen halides.

The addition order of cocatalyst and halometal activator becomes extremely important in those cases where the partially formed cocatalyst component contains impurities that react with the cocatalyst and halometal activator and these impurities can't be easily removed. In these cases the formation of hydrogen halides must be kept to a minimum by following the teachings of this invention.

To prevent the formation of these impurities in the cocatalyst component, a method of preparing the cocatalyst component is provided by this invention to avoid significant reaction between the halometal activator and the alcohols, phenols or other active hydroxyl-containing compounds by always forming the cocatalyst first before adding the halometal activator.

The objective of the process of this invention is to formulate storage stable cocatalyst components containing the activated cocatalyst without generating hydrogen halides and, therefore, avoid catalyzing unwanted crosslinking reactions between the unsaturated impact modifiers and/or monomers. It is noted that all of the norbornene-type monomers have unsaturation and these also crosslink in the presence of the hydrogen halides.

Because of their higher molecular weight, it takes relatively few crosslinks between the unsaturated polymers used as impact modifiers to increase the viscosity of the cocatalyst component sharply and, in the extreme, turn it into a solid rubbery mass.

Crosslinking reactions between the norbornene-type monomers are harmful to the extent that the unsaturation in the norbornene ring of these monomers participates in the crosslinking reaction. These monomers, unless there is a second norbornene ring in their structure, do not ring-open polymerize. They form low molecular weight species that lower the physical properties of the ring-opened polymer.

Crosslinking reactions between the unsaturated impact modifiers and the norbornene-type monomers are thought to be relatively harmless as they would not be expected to either increase the viscosity of the cocatalyst component or form low molecular weight species that lower the physical properties of the ring-opened polymer.

Preferred embodiments of the present invention are storage stable cocatalyst components which contain unsaturated rubbers as impact modifiers. To obtain these components, the alkyl aluminum or alkyl aluminum halide is first added to a cycloolefin monomer as defined above. An alcohol diluted in cycloolefin monomer is then added and permitted to react to form the cocatalyst. Reaction is permitted to continue for about 1 to 20 minutes at ambient temperature. The quantity of alcohol is limited to that which reacts with all of the alkyl substituents on the alkyl aluminum or alkyl aluminum halide. Preferably the quantity of alcohol provides a molar ratio of below about 1:1 alcohol to aluminum. Following the alcohol addition, a halometal activator is introduced. The quantity of activator provides a molar ratio of below about 1:1 of activator to cocatalyst.

In the polymerization systems of the present invention, the storage stable cocatalyst component containing the cocatalyst is paired with one or more storage stable components containing the organo ammonium molybdate or ammonium tungstate metathesis catalyst.

Other elements of the reactive formulation can be introduced into the components of the polymerization system. Preferably, each of these components contain a portion of the impact modifiers, viscosifying agents, pigments, fillers such as Raven 410 carbon black, reinforcing agents, blowing agents, flame retardant surfactants and fillers which are intended for the reactive formulation. Where these components are maintained substantially free of hydrogen halides, reaction between these species, such as unsaturated rubbers, can be avoided.

The following examples are provided to illustrate preferred embodiments of the present invention. They are not intended to limit the scope of this disclosure to the embodiments exemplified therein. All percentages are by weight unless specified otherwise.

EXAMPLE 1

About 85.9 gms of a 90/10 dicyclopentadiene/ethylidene norbornene mixture was used to make a storage stable cocatalyst component in accordance with the process of this invention. The dicyclopentadiene was obtained from Exxon Corporation and was about 99% purity. The ethylidene norbornene was obtained from Union Carbide but can be synthesized by reaction of 1,4-butadiene and cyclopentadiene to form vinylidene norbornene followed by isomerization to ethylidene norbornene.

To this dicyclopentadiene/ethylidene norbornene mixture were added two charges of impact modifier. One charge comprised 2.63 gms of a roll mill mixed masterbatch of a low molecular weight styrene-butadiene block copolymer obtained from Shell Chemical Corporation, sold under the tradename Kraton 1102 and Raven 410 carbon black in a weight ratio of 70/30. The next charge of impact modifier comprised 7.9 gms of another low molecular weight styrene butadiene block copolymer sold by Shell Chemical Corporation under the tradename Kraton 1101.

Following solution of the impact modifier, 2.63 ml of a 1 molar n-propanol solution was blended into the mixture followed by 0.54 ml (neat) of diethyl aluminum chloride. The solvent used for the propanol solution was 90/10 dicyclopentadiene/ethylidene norbornene mixture. After mixing in the n-propanol and diethyl aluminum chloride, the catalyst activator, was mixed therein. The catalyst activator was silicon tetrachloride $SiCl_4$. The quantity of silicon tetrachloride added was about 0.25 ml. (neat).

Following completion of the component, it was stored for over 112 hours at about 46° C. with no evidence of gel formation or significant increase in viscosity.

EXAMPLE 2

About 85.9 gms of a 90/10 dicyclopentadiene/ethylidene norbornene mixture, as described in Example 1, was blended with 9.7 gms of a hydrogenated styrene-butadiene block copolymer sold under the tradename Kraton G 1656 by Shell Chemical Co. Following the addition of impact modifier, a solution of the n-propanol (1 Molar in 90/10 DCPD/ENB), diethyl aluminum chloride (neat) and silicon tetrachloride (neat) were added in the same amount and in the same order as described in Example 1 to complete the storage stable cocatalyst component. This cocatalyst component showed no signs of gel formation or increase in viscosity after 112 hours at 46° C.

EXAMPLE 3

A storage stable cocatalyst component was produced in accordance with the process of this invention following the procedures of Example 1. About 85.9 gms of a 90/10 dicyclopentadiene/ethylidene norbornene mixture was used to solubilize the impact modifiers Kraton 1102 (1.84 gms) and Kraton 1101 (7.9 gms) as described in Example 1. The Kraton 1102 was not preblended with Raven 410 carbon black. After dissolving the impact modifiers within the dicyclopentadiene/ethylidene norbornene mixture, 1.0M n-propanol solution (2.63 ml), diethyl aluminum chloride (0.5 ml) (neat) and $SiCl_4$ (0.25 ml) (neat) were added to the mixture in sequence and mixed as described in Example 1. The storage stable component produced therefrom showed no signs of gel formation or increase in viscosity after 112 hours at 46° C.

COMPARATIVE EXAMPLE A

A component of a reactive formulation was produced by an alternative method to compare storage stability with the components of the present invention. About 85.9 gms of a 90/10 mixture of dicyclopentadiene and ethylidene norbornene was used. The dicyclopentadiene was about 99% pure, obtained from Exxon Chemical Corporation and the ethylidene norbornene was obtained from Union Carbide.

To this dicyclopentadiene/ethylidene norbornene mixture were added 2.63 gms of the impact modifier Kraton 1102 as described in Example 1, having 30% Raven 410 mixed therein. In addition, Kraton 1101 (7.9 gms) was also dissolved into the mixture. Following addition of the impact modifiers, the halometal activator, silicon tetrachloride (0.25 ml) was added neat. Following addition of the silicon tetrachloride, diethyl aluminum chloride and a solution of n-propanol (1 Molar) were added in this sequence. The solution was mixed after each addition. The cocatalyst and alcohol solution added were as described in Example 1 and were used in the same quantity, i.e., 0.54 ml of diethylaluminum chloride (neat) and 2.63 ml of 1 Molar propanol.

After 64 hours at 46° C., the mixture gelled and would not flow. It is believed hydrogen chloride was generated by this addition sequence and catalyzed the crosslinking of the impact modifier to a thick gel.

COMPARATIVE EXAMPLE B

Another cocatalyst component of a reactive formulation was prepared by methods which do not conform to the present invention. The procedures used in Comparative Example A were followed except that the Kraton 1102 impact modifier used was 1.84 gms and did not contain 30% by weight Raven 410 carbon black.

The following components were added in sequence: 90/10 mixture of dicyclopentadiene/ethylidene norbornene (85.9 gms), Kraton 1102 (1.84 gms) and Kraton 1101 (7.9 gms), silicon tetrachloride (0.25 ml), diethyl aluminum chloride (0.54 ml) and 1 molar propanol solution (2.63 ml). After each addition, a uniform solution was obtained.

After 46 hours at 46° C., the composition became very thick but did not gel. After 112 hours at 46° C., the component thickened to an even higher viscosity. As in experiment A, HCl catalyzed crosslinking of the impact modifier is believed to be the cause of the increased viscosity. The increase in viscosity indicates instability of the system. Traces of water in the monomers and impact modifiers can react with the SiCl$_4$ to molar quantities of HCl equivalent to the molar quantities of water when this addition sequence is used. When both SiCl$_4$ and diethylaluminum chloride are present in the solution to which the n-propanol is added, most of the n-propanol will react with the diethylaluminum chloride producing ethane not HCl. However, some of the n-propanol will react with the SiCl$_4$ to produce HCl.

When diethyl aluminum chloride was added before the SiCl$_4$, the diethyl aluminum reacted with the traces of water in the monomer and impact modifier producing ethane not HCl. Water was, therefore, not present when the SiCl$_4$ was added.

Thus, in both this experiment and experiment A, HCl was produced when (1) the SiCl$_4$ was added to the solution of DCPD/ENB and impact modifiers and (2) when n-propanol was added to the solution of DCPD/ENB, impact modifiers, SiCl$_4$ and diethylaluminum chloride.

COMPARATIVE EXAMPLE C

Procedures of Comparative Example A were followed to further illustrate the instability of components produced by processes which do not conform to the present invention. A component mixture was produced as in Comparative Example A except that the solution of propanol was not introduced. The following components were used in the same quantity and mixed in the same sequence as described in Comparative Example A: 90/10 mixture of dicyclopentadiene/ethylidene norbornene (85.9 gms), Kraton 1102 with 30% Raven 410 carbon black (2.63 gms), Kraton 1101 (7.9 gms), silicon tetrachloride (0.25 ml), and diethyl aluminum chloride (0.54 ml).

After 12 hours at 46° C., the mixture did not gel and was very thick, but not as thick as Example A, suggesting that the halometal activator, SiCl$_4$, reacted with any water present to form some HCl but not at the levels produced when reacted with the propanol.

COMPARATIVE EXAMPLE D

This example demonstrates that the viscosity of the cocatalyst component can be maintained low by methods other than the present invention where the impact modifiers are properly selected to be unreactive with hydrogen halide catalysis. In this example, a saturated rubber is utilized as an impact modifier. The impact modifier was Kraton G 1652 (9.7 gms), a hydrogenated styrene-butadiene block copolymer from Shell Chemical Co.

To make the component of this comparative example, a dicyclopentadiene/ethylidene norbornene mixture as described in Example 1 was used to solubilize the saturated rubber impact modifier Kraton G 1652 (9.7 gms). Following solution of the impact modifier, silicon tetrachloride (0.25 ml, neat) was added followed by diethyl aluminum chloride (0.54 ml, neat) and a solution of 1 molar propanol (2.63 ml), in 90/10 dicyclopentadiene/ethylidene norbornene.

After 112 hours at 46° C., no viscosity change was detected in the component formed. While this example demonstrates an alternative method for providing a low viscosity cocatalyst component, HCl is still formed and such a method not only limits the use of desirable additives, but results in a lowering of physical properties in the ring-opened polymer due to formation of unwanted low molecular weight, crosslinked monomer species. The process of the present invention provides more flexibility in the selection of additives, cycloolefin monomers, and improved polymer properties.

STABILITY STUDIES FOR VARIOUS CATALYST FORMULATIONS

Various blends used to form the components of the reactive formulation were produced and stored at 46° C. and checked for viscosity build up, polymer formation or any change in appearance.

Five formulations (A–E) were made which do not contain all of the elements found within the components provided by the present invention.

Formulations A and B

Two mixtures were made containing a 90/10 dicyclopentadiene/ethylidene norbornene mixture (89.5 gms) and Diene 55 polybutadiene impact modifier from Firestone (2.5 gms). One mixture contained 8 ml of a 0.5 molar diethyl aluminum chloride solution in 90/10 dicyclopentadiene/ethylidene norbornene and another contained a 0.5 molar triethyl aluminum solution (8.0 ml) in a 90/10 DCPD/ENB solution. Both were found to be stable after being stored in a capped 7 oz. pop bottle for one month at 46° C.; however, these cocatalyst precursors were not alcohol modified or halometal activated.

Formulations C and D

Two mixtures were prepared with the same chloride content. Mixture C was prepared by first dissolving 2.5 gms of Diene 55 in 81.5 gms of 90/10 DCPD/ENB, adding 8.0 ml of 0.5M diethyl aluminum chloride, mixing, adding 8.0 ml of 0.25M SiCl$_4$ and mixing again. Mixture D was prepared by first dissolving 2.5 gms of Diene 55 in 77.5 gms of 90/10 DCPD/ENB, adding 8.0 ml of 0.5M triethyl aluminum, mixing, adding 12.0 ml of 0.25M SiCl$_4$ and mixing again. The diethyl aluminum chloride, triethyl aluminum and SiCl$_4$ were solutions made up in 90/10 DCPD/ENB. Both mixtures were stable, i.e., showed no signs of viscosity build up or polymer formation after being stored in a capped 7 oz. pop bottle for one month at 46° C. However, the cocatalyst precursors therein were unmodified with alcohol.

Formulation E

Mixture E was prepared by dissolving 2.5 gms of Diene 55 in 87.5 gms of 90/10 DCPD/ENB. Two milliliters of a 1.0 molar n-propanol solution in 90/10 DCPD/ENB were added to the mixture, mixed, 8 ml of a 0.5 molar diethyl aluminum chloride solution in 90/10 DCPD/ENB were then added and mixed again. This mixture also remained stable in a capped 7 oz. pop bottle stored at 46° C. for one month; however, the cocatalyst was not halometal activated.

EXAMPLE 4

About 75.5 gms of a 90/10 dicyclopentadiene/ethylidene norbornene mixture was used in preparing a storage stable component in accordance with the process of this invention. The monomer mixture was used to solubilize 2.5 gms of Diene 55, then 2 ml of a 1 Molar propanol solution in 90/10 DCPD/ENB was added, the solution mixed, and 8 ml of a triethyl aluminum solution (0.5 Molar) in 90/10 dicyclopentadiene/ethylidene norbornene was added and the solution mixed again. Following formation of the cocatalyst, 12 ml of a 0.25 molar solution of silicon tetrachloride in 90/10 dicyclopentadiene/ethylidene norbornene was added and the solution mixed.

The cocatalyst component was stored at 46° C. for one month in a 7 ounce bottle that was capped. No viscosity build up or polymer formation was noticed. The cocatalyst component was faintly yellow in color.

During the test for the catalyst activity after aging for one month, it was noticed that a minute amount of polymer deposited on the cap of the bottle. One-half of the aged sample, i.e., about 50 ml, was diluted with 45 gms of a 90/10 dicyclopentadiene/ethylidene norbornene mixture. To this mixture were added 5.0 ml of a 0.0125 Molar catalyst solution in DCPD/ENB. The catalyst was $(R_3NH)_4Mo_8O_{26}$ where R was $C_{12}H_{25}$. Polymerization was noticed at 40 minutes at room temperature subsequent to the addition of the ammonium molybdate catalyst. The pot life at room temperature was found to be approximately 25 minutes (start of thickening of mixture). Polymerization at 60° C. in molding a ⅛" plaque provided 97% conversion of the monomer.

EXAMPLE 5

A storage stable component was prepared in accordance with the process of this invention first by dissolving Diene 55 (2.5 gms) in 79.5 gms of a 90/10 dicyclopentadiene/ethylidene norbornene mixture. To this mixture were added 2.0 ml of a 1.0 M n-propanol solution, 8 ml of a 0.5M diethyl aluminum chloride solution and 8 ml of a 0.25M silicon tetrachloride solution in the sequence given with mixing after each addition. The n-propanol, diethyl aluminum chloride and silicon tetrachloride were dissolved in a 90/10 dicyclopentadiene/ethylidene norbornene mixture. The mixture was stored at 46° C. for one month in a 7 ounce pop bottle which was capped. The cocatalyst component was golden yellow in color. There was no evidence of viscosity build up in the mixture. After one month, a minute amount of polymer was found to be deposited on the bottle cap. This example shows that the order of addition of alcohol on cocatalyst does not effect stability as long as both are added prior to the activator.

To test for the cocatalyst activity, about 50 ml of the stored component was diluted with 45 gms of a 90/10 dicyclopentadiene/ethylidene norbornene mixture. To this mixture was added 5 ml of a 0.025 molar ammonium molybdate catalyst $(R_3NH)_4Mo_8O_{26}$ where R is $C_{12}H_{25}$ in 90/10 DCPD/ENB. The pot life of the composition was found to be greater than 360 minutes and when attempts were made to mold ⅛" plaques at 60° C., the polymerization was very sluggish.

EXAMPLE 6

Two storage stable catalyst components which complement the cocatalyst components of the present invention were prepared. The first catalyst component was prepared by dissolving 2.5 gms of Diene 55 in 85.5 gms of a 90/10 DCPD/ENB mixture. Two milliliters of a 1.0M n-propanol solution in 90/10 DCPD/ENB was then added and mixed thoroughly. Next, 10 ml of a 0.0125M solution of molybdate solution in 90/10 DCPD/ENB was added and mixed thoroughly. The molybdate was $(R_3NH)_4\, Mo_8O_{26}$ where R is $C_{12}H_{25}$. The second catalyst component was prepared by dissolving 2.5 gms of Diene 55 in 87.5 gms of 90/10 DCPD/ENB mixture. No n-propanol was added to this component. The same type and amount of molybdate solution was added to the second as to the first component and mixed thoroughly.

These mixtures were stored at 46° C. for one month in capped 7 oz. pop bottles.

Both mixtures showed no sign of instability, i.e., viscosity build up, polymer formation or color change after being stored in a capped 7 oz. pop bottle for one month at 46° C.

To demonstrate the catalysts within these components were still active, 50 ml of each was diluted with about 41 gms of dicyclopentadiene/ethylidene norbornene mixture. One milliliter of n-propanol solution (1.0 Molar) was added to the component which contained no propanol. The last component added to each composition comprised a premix of 4 ml of diethyl aluminum chloride (0.5 molar in 90/10 DCPD/ENB) and 4 ml of silicon tetrachloride (0.25 molar in 90/10 DCPD/ENB). Both compositions were found to have no measurable pot life. Pre-gellation occurred upon adding the cocatalyst solution. This was caused by a too-active cocatalyst component. Localized polymerization occurred at about 3 minutes. This suggested the propanol modifier did not have an opportunity to react with the cocatalyst and provide a more controlled polymerization reaction. The catalyst components were still quite active or this would not have happened.

CONTROL EXAMPLE F

Attempts were made to incorporate the silicon tetrachloride within the catalyst component which complements the storage stable cocatalyst compositions of the present invention. About 75.5 gms of a dicyclopentadiene/ethylidene norbornene monomer mixture were used to dissolve 2.5 gms of Diene 55 impact modifier. To this mixture were added 12 ml of a silicon tetrachloride solution (0.25 molar in 90/10 DCPD/ENB solution) followed by 10 ml of a molybdate catalyst solution (0.0125 molar in 90/10 DCPD/ENB). The catalyst was as described in Example 4.

The mixture was found to have solidified after about one day at 46° C. suggesting that the silicon tetrachloride and molybdate formed a slow acting ring-opening metathesis catalyst system.

EXAMPLE 7

This example is provided to show the effects of small amounts of water on the storage stability for the components of this invention. For Example 7, components were prepared by first dissolving about 2.5 gms of impact modifier into about 80–82 gms of a monomer mixture (90/10 weight ratio of dicyclopentadiene/ethylidene norbornene). After dissolving in the impact modifier, 1.4 ml of an alcohol/aqueous solution, 8.0 ml of a 0.5 molar diethyl aluminum chloride solution and 8.0 ml of a 0.25 molar silicon tetrachloride solution were added in sequence, mixing after each addition. The solvent for the alcohol, cocatalyst and activator solutions was a 90/10 dicyclopentadiene/ethylidene norbornene monomer mixture.

Four different impact modifiers were used, Diene 55, Kraton 1102, Kraton 1657 and Kraton 1107 to provide test groups A through D. In each test group, four runs were made with different levels of water at 360 ppm, 180 ppm, 90 ppm and 0 ppm. These various moisture levels were obtained by utilizing three different alcohol-/aqueous solutions, formulated as follows:

(1) 1.0 Molar t-Butanol, 1.429 Molar H$_2$O
  (a) 1.48 gms (1.89 ml) t-butanol
  (b) 0.51 gms (0.51 ml) distilled water
  (c) 17.25 gms (17.6 ml) 90/10 DCPD/ENB
(2) 1.0 Molar t-Butanol, 0.714 Molar H$_2$O
  (a) 1.48 gms (1.89 ml) t-butanol
  (b) 0.26 gms (0.26 ml) distilled water
  (c) 17.5 gms (17.85 ml) 90/10 DCPD/ENB
(3) 1.0 Molar t-Butanol, 0.357 Molar H$_2$O
  (a) 1.48 gms (1.89 ml) t-butanol
  (b) 0.13 gms (0.13 ml) distilled water
  (c) 17.6 gms (17.99 ml) 90/10 DCPD/ENB The components were stored for 24 hours at room temperature after which changes in their condition were recorded.

For all test runs (A–D) containing 360 ppm of added H$_2$O, the cocatalyst component turned to an orange liquid and a large layer of a brownish orange precipitate formed.

For all test runs containing 180 ppm of added H$_2$O, the cocatalyst component turned to a yellow liquid and a small layer of a brownish orange -precipitate formed. Where only 90 ppm of added H$_2$O was present, the cocatalyst component turned slightly yellow and only a small amount of a brownish orange precipitate was formed.

Where no water was added, the cocatalyst component remained water white with a very small amount of white precipitate. The presence of the dark precipitate and the dark color for the liquid show that moisture within the cocatalyst component is deleterious to storage stability and that instability increases with the level of water present.

While this invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A method for producing a storage stable cocatalyst component of a reactive formulation, wherein said reactive formulation comprises one or more cycloolefin monomers having a norbornene moiety together with a ring-opening metathesis catalyst system in sufficient quantity to polymerize these cycloolefin monomers in bulk,
   said cocatalyst component comprising one or more cycloolefin monomers having a norbornene moiety combined with a halometal activated cocatalyst,
   said method comprising the following sequential steps:
   first, forming a mixture comprised of one or more cycloolefin monomers and a cocatalyst, said cocatalyst being the reaction product of an alkyl aluminum or alkyl aluminum halide with an active hydroxy-containing compound, and
   second, adding a halometal activator to said mixture.

2. A method as in claim 1 wherein the mixture comprised of one or more cycloolefin monomers and cocatalyst is substantially free of hydrogen halide and compounds which deactivate the cocatalysts.

3. A method as in claim 1 comprising the additional step of removing water from the mixture prior to the addition of the co-catalyst.

4. A method as in claim 1 wherein the active hydroxy-containing compound is selected from phenols of from 6 to 10 carbon atoms and alcohols of from 1 to 10 carbon atoms and the molar ratio of said alcohols and phenols to the alkyl aluminums or alkyl aluminum halides is less than 2:1.

5. A method as in claim 4 wherein the molar ratio of alcohols and phenols to alkyl aluminums and alkyl aluminum halides falls within the range of about 0.5:1.0 to 1.0:1.0.

6. A method as in claim 3 wherein the water is removed from the mixture by azeotropic distillation.

7. A method as in claim 1 wherein said metathesis cocatalyst activator is a halide-containing compound of the formula

where m is 0 to 4 and n is 1 to 5, X is individually selected from halogens selected from chlorine, bromine, iodine and fluorine; R" is individually selected from hydrogen, alkyl, alkenyl, alkoxy, aryl, alkaryl, and saturated and unsaturated cyclic groups, and Y is a metal selected from tin, lead, magnesium, antimony, boron, germanium and silicon; and said cocatalyst is of the formula

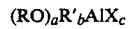

wherein R' is individually selected from alkyl and aryl groups, R is individually selected from hydrogen, alkyl groups and aryl groups, X is halogen, and (a), (b) and (c) represent equivalents of RO, R and X, respectively, where (a) is 0 to 2, (b) is 0 to 3 and (c) is 0 to 2, provided that the sum of a, b, and c is 3.

8. A method as in claim 1 wherein the metathesis cocatalyst activator is silicon tetrachloride and the molar ratio of silicon tetrachloride to the cocatalyst is in the range of 0.1:1 to 0.7:1.

9. A method as in claim 1 comprising the additional step of dispersing additives within the cycloolefin monomers prior to the formation of the mixture with cocatalyst, wherein said additives are selected from the class consisting of flame retardants, fillers, reinforcements, pigments and blowing agents.

10. A method for producing a storage stable cocatalyst component of a reactive formulation, wherein said reactive formulation comprises one or more cycloolefin monomers having a norbornene moiety together with a ring-opening metathesis catalyst system in sufficient quantity to polymerize these cycloolefin monomers in bulk,
   said cocatalyst component comprising one or more cycloolefin monomers having a norbornene moiety together with a halometal activated cocatalyst,
   said method comprising the following steps:
   forming a mixture comprised of one or more cycloolefin monomers,
   azeotropically distilling off any water within said monomer, and
   introducing a cocatalyst to said mixture of cycloolefin monomers, said cocatalyst being the reaction produce of an alkyl aluminum or alkyl aluminum halide with an active hydroxy-containing compound, and then
adding a halometal activator to said mixture.

11. A method as in claim 10 wherein the mixture of cycloolefin monomers is maintained substantially free of hydrogen halides and compounds which deactivate the cocatalysts.

12. A method as in claim 10 wherein the cocatalyst is formed in situ by reaction of an alkyl aluminum or alkyl aluminum halide with an active hydroxy-containing compound selected from the group consisting of phenols of from 6 to 10 carbon atoms and alcohols of from 1 to 10 carbon atoms, wherein the molar ratio of said alcohols and phenols to the alkyl aluminums or alkyl aluminum halides is less than 2:1.

13. A method as in claim 10 wherein said metathesis cocatalyst activator is a halide-containing compound of the formula $$R''_m YX_n$$

where m is 0 to 4 and n is 1 to 5, X is individually selected from halogens selected from chlorine, bromine, iodine and fluorine; R'' is individually selected from hydrogen, alkyl, alkenyl, alkoxy, aryl, alkaryl, and saturated and unsaturated cyclic groups, and Y is a metal selected from tin, lead, magnesium, antimony, boron, germanium and silicon; and said cocatalyst is of the formula $$(RO)_a R'_b AlX_c$$

wherein R' is individually selected from alkyl and aryl groups, R is individually selected from hydrogen, alkyl groups and aryl groups, X is halogen, and (a), (b) and (c) represent equivalents of RO, R and X, respectively, where (a) is 0 to 2, (b) is 0 to 3 and (c) is 0 to 2, provided that the sum of a, b, and c is 3.

14. A method as in claim 10 wherein the metathesis cocatalyst activator is silicon tetrachloride and the molar ratio of silicon tetrachloride to the cocatalyst is in the range of 0.1:1 to 0.7:1.0.

15. A method as in claim 10 comprising the additional step of dispersing additives within the cycloolefin monomers prior to azeotropically distilling off any water within said monomers wherein said additives are selected from the class consisting of impact modifiers, flame retardants, fillers, reinforcements, pigments, release agents and blowing agents.

16. A storage stable component produced in accordance with the method of claim 1.

17. A storage stable component produced in accordance with the method of claim 8.

18. A storage stable component produced in accordance with the method of claim 10.

19. A storage stable component in accordance with claim 16 which additionally contains additives selected from the group consisting of fillers, reinforcements impact modifiers, pigments, blowing agents, flame retardants and release agents.

20. A storage stable component in accordance with claim 16 which additionally contains impact modifiers selected from the group consisting of saturated and unsaturated rubbers.

21. A reactive formulation comprising two or more separate storage stable components which remain gel free for over one month, and which are capable of polymerizing to a degree of conversion above 90% when combined, as determined by thermal gravimetric analysis,
wherein at least one storage stable component is as defined in claim 16 and
at least one component comprises
(a) one or more cycloolefin monomers containing a norbornene moiety and
(b) a metathesis catalyst selected from ammonium molybdates and ammonium tungstates.

22. A reactive formulation as in claim 21 wherein all components contain an impact modifier.

23. A reactive formulation as in claim 22 wherein the impact modifier within said components contain unsaturated carbon atoms.

24. A reactive formulation as in claim 21 wherein the one or more cycloolefin monomers within the components is selected from the group consisting of dicyclopentadiene, trimers of cyclopentadiene, methyl tetracyclododecene, tetramers of cyclopentadiene, methyl norbornene, hexacycloheptadodecene and ethylidene norbornene.

* * * * *

UNITED STATES PATENT AND TRADEMARK OFFICE
CERTIFICATE OF CORRECTION

PATENT NO. : 4,943,621

DATED : July 24, 1990

INVENTOR(S) : Dennis J. Janda et al.

It is certified that error appears in the above-identified patent and that said Letters Patent is hereby corrected as shown below:

In column 1, line 10, after "reactive" insert the phrase --formulation provides for bulk ring-opening polymerization--.

In column 18, line 68, change "produce" to --product--.

Signed and Sealed this

Fifteenth Day of December, 1992

Attest:

DOUGLAS B. COMER

*Attesting Officer*    *Acting Commissioner of Patents and Trademarks*